United States Patent [19]

van Kuijk

[11] 4,106,481

[45] Aug. 15, 1978

[54] APPARATUS FOR RECOVERING SOLAR ENERGY

[76] Inventor: Josephus Petrus Maria van Kuijk, Chemin des Vignes 85, 1814 La Tour de Peilz, Switzerland

[21] Appl. No.: 731,671

[22] Filed: Oct. 12, 1976

[30] Foreign Application Priority Data

Oct. 20, 1975 [NL] Netherlands .................. 7512289

[51] Int. Cl.² ..................................................... F24J 3/02
[52] U.S. Cl. ........................................... 126/271; 126/270; 350/293
[58] Field of Search ............... 126/270, 271; 237/1 A; 350/293, 288, 295

[56] References Cited

U.S. PATENT DOCUMENTS 2,969,788  1/1961  Newton ............................ 126/271
3,915,147  10/1975  Rineer ............................. 126/271
4,003,638  1/1977  Winston ........................... 126/271
4,026,269  5/1977  Stelzer ............................ 126/271

*Primary Examiner*—Kenneth W. Sprague
*Attorney, Agent, or Firm*—O'Brien and Marks

[57] ABSTRACT

An apparatus for recovering solar energy comprising a plurality of fluid warming up tubes 2a–2g which extend in parallel and side-by-side relationship in one plane. Each tube has two associated plane reflection surfaces which enclose a fixed angle α' in the order of 30°–40°. The reflection surfaces are arranged to be pivoted and moved transversely to said plane so that their bisector plane containing the centerline of the respective tube can be maintained directed to the sun without reflection surfaces associated with successive tubes overshadowing each other.

5 Claims, 6 Drawing Figures

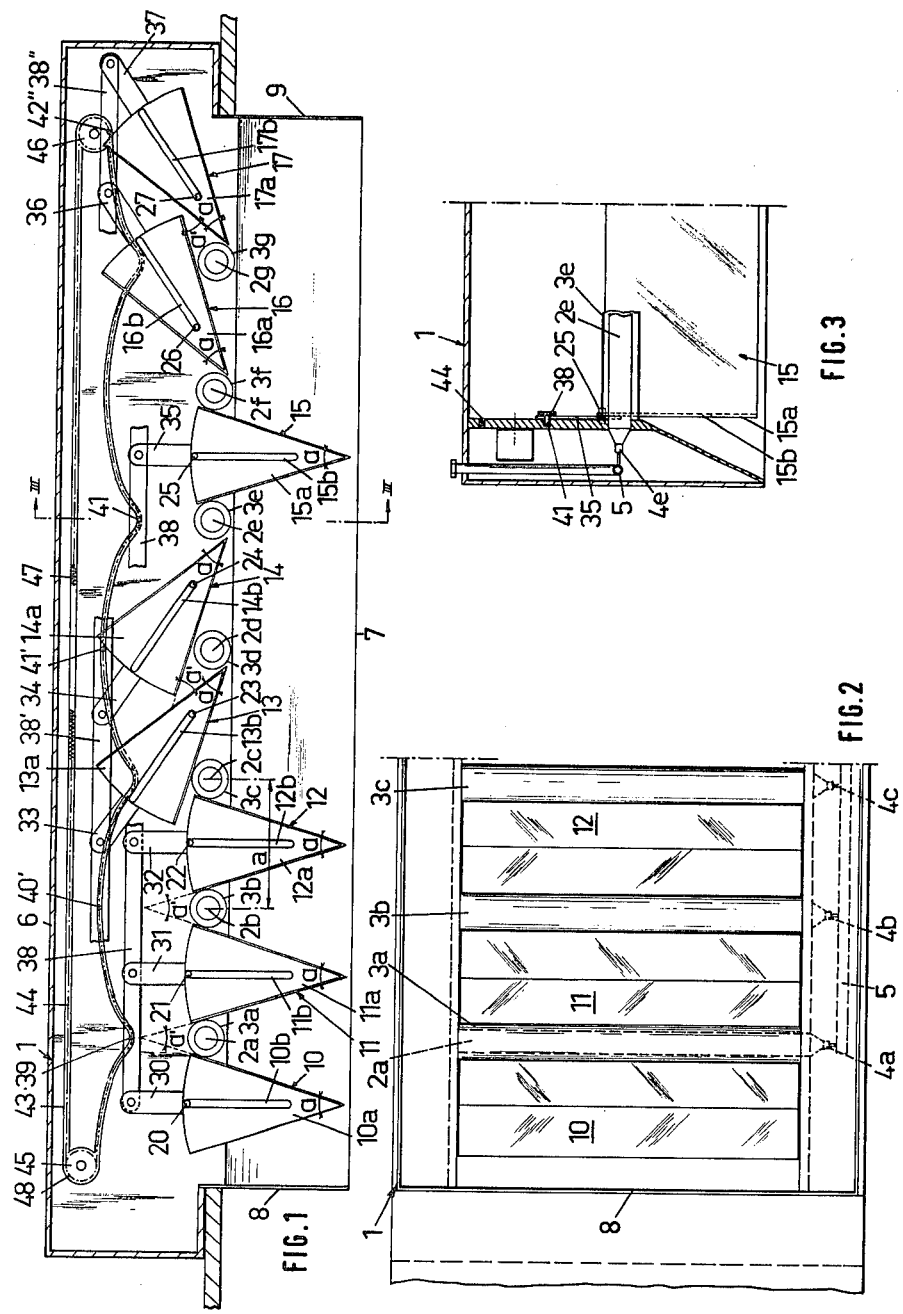

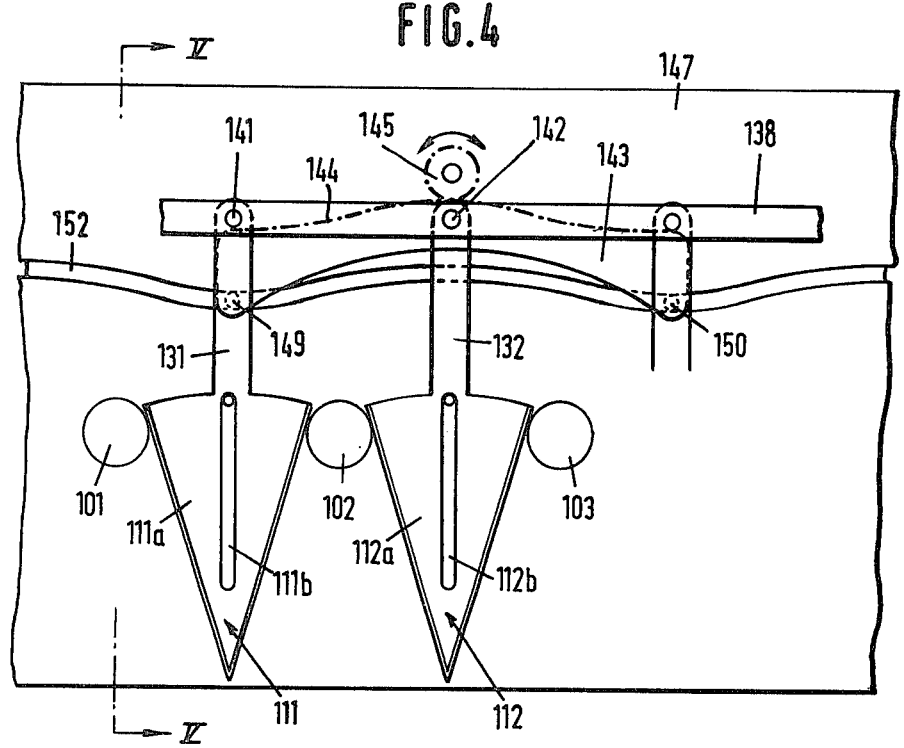
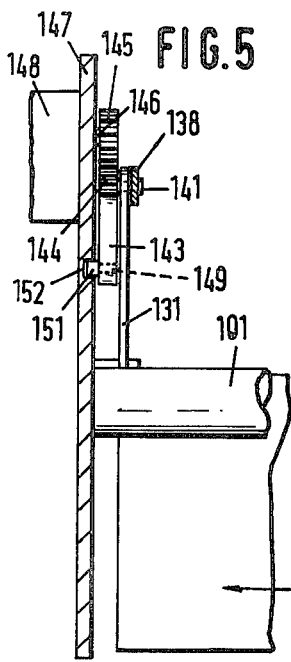
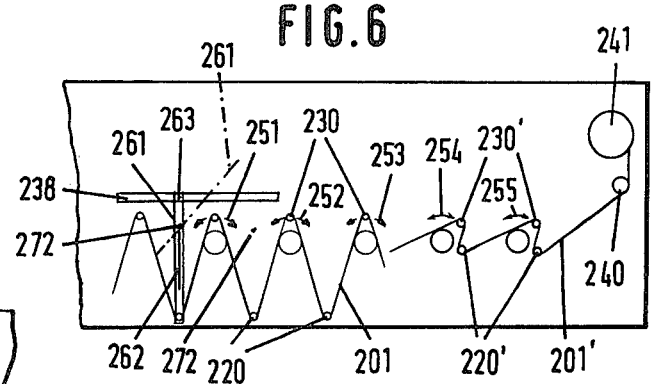

APPARATUS FOR RECOVERING SOLAR ENERGY

The present invention relates to an apparatus for recovering solar energy of the type provided with a set of fluid warming-up tubes extending in parallel and side-by-side relationship, each tube having an associated pair of reflection surfaces diverging therefrom, including a specific angle, said surfaces being tangential to an imaginary circular cylindrical surface, coaxial to the tube, and which surfaces, reflecting the incident sunlight towards the tube, maintaining their bisector plane directed to the sun, are pivotable.

Apparatuses of the above described type are known wherein each pair of reflection surfaces associated with one fluid warming-up tube are formed by the inner sides of the sidewalls of a tray-like warming-up element which, including said sidewalls, is adapted for pivotal movement about the tube axis. With a view to an optimal orientation of the reflected sun beams towards the tube, it was found practical for the above mentioned specific angle included by the substantially plane reflection surfaces to lie in the order of 30°–40°. It is inevitable that, when a number of such tray-like warming-up elements are arranged in side-by-side relationship, each co-pivoting with the position of the sun about the axis of the associated, fixedly disposed fluid warming-up tube, the pivoting range remains limited to less than 180° by the presence of the tray-like adjacent warming-up elements. As a result the number of fluid warming-up tubes to be arranged per unit of surface area of such an apparatus, i.e. the "surface yield", or "spacial yield", of such known apparatuses is insufficient.

It is an object of the invention to provide an improvement of this yield so that the interspace between the successive fluid warming-up tubes can be considerably less than was possible with conventional arrays.

To this effect an apparatus of the above type according to the invention is characterized in that said reflection surfaces are likewise movable with a direction component transverse to the plane defined by the tubes.

Through this additional movability of the reflection surface, insofar these would come within the reach of adjacent reflection surfaces as a result of the pivotal movement required for following the solar positions, they can be moved backwardly substantially according to the sun beam incidence direction. The fluid warming-up tubes can thus be arranged with less interspace, preserving the constantness of the angle included by the two reflecting surfaces associated with each tube.

In accordance with a preferred embodiment of the invention, the two adjacent reflecting surfaces associated with two successive tubes, may be combined to bodies forming a dihedral angle, which bodies are mounted movably about pivot pins parallel to the tubes, pivoting with a direction component transverse to the plane defined by the tubes. Naturally, the angle enclosed between each pair of reflection surfaces associated with one warming-up tube, i.e. between the two adjacent reflection surfaces of each pair of successive bodies, always remains constant. Said angle is naturally equal to the angle between the reflection surfaces of each body, so also in the order of 36°. The movements executed each day by said bodies are thus defined by the various, possible positions, which two reflection surfaces of said body continue to be tangential to the two respective adjacent cylindrical surfaces.

Each body has the position set furthest in the direction towards the sun at the highest sun position, assuming that the apparatus has the ideal position, i.e. with the axes of the warming-up tubes in a vertical plane directed substantially North-South. On the other hand, the furthest retracted positions are occupied by the bodies at sunrise and sunset, in which case the bodies forming a dihedral angle will have also pivoted sidewards furthest from the above mentioned central position. The pivot pin may be formed according to the invention for each body by two fixed axle pins which extend from either side in the direction towards each other, in slots extending according to the bisector plane of the dihedral angle, said slots being disposed in respective end walls of said body, said slots extending about three quarters of said height of said end walls.

The required movement of the dihedral angle forming bodies according to the invention can be effected in that said bodies are interconnected through a coupling rod substantially parallel to the plane defined by the tube, which rod is movably driven by a guide, parallel to itself, acting on the rod at locations spaced apart in longitudinal direction thereof. Accordingly, said guide follows the path which said locations are to describe for imparting to the bodies the above defined movement from sunrise to sunset, the bodies on either side remaining substantially tangential to the cylindrical surfaces coaxial with the adjacent warming-up tubes.

In addition to forming the reflection surfaces by the outermost surfaces of the above dihedral angled bodies, it is also possible according to a modified embodiment to form the reflection surfaces associated with at least a number of successive fluid warming-up tubes according to the invention, by one and the same, continuous reflecting band which, at the junctions of the successive reflection surfaces, runs over return rollers guided for movement with direction components transverse to the tube-defined plane, and moreover with direction components parallel to said plane, on which band ends there is exerted a tensile force by means which maintain the band in taut condition.

The advantage obtained by the above described apparatus according to the invention lies in the first place in a greater number of successive warming-up tubes to be arranged over a specific width measured from East to West, which is available for instance in case of arrangement in houses. No shaded "dead angles" are formed. In particular during the hours of high sun positions, the useful surface yield and hence the warming-up yield of the apparatus is optimal. Thus a high average temperature level for the warmed up fluid is attainable.

During the hours of low sun positions — the reflection surfaces being swivelled backwards and sideways, relative to the position occupied at noon, wherein they occupy their position furthest extended in the direction towards the sun — the width measured transversely to the longitudinal direction of the tube, of the beam of sun rays captured decreases. However, it has the advantage of a longer duration of unshaded capture as compared to the situation prevailing with non-backwardly moving reflection surfaces.

From a constructional viewpoint it is advantageous that the contemplated movement of displacement of the reflection surfaces, as appears in particular from the above mentioned preferred embodiments, can be realized simply.

Since, on application of the invention on a comparatively small surface, a high heat output of warmed up fluid is attained, the invention offers the possibility of a practical and in particular also economic use for a very broad field of application.

Through the high heat level to be obtained, application in all places of the world having a reasonable number of sun hours, is possible in a very simple manner for obtaining hot water for domestic use.

In the simplest case the fluid heated in the warming-up tubes may be water. This is then contacted in a boiler in heat exchanging contact with tap-water supplied to said boiler. In case of surplus of heat captured by means of the apparatus according to the invention, relative to the hot water requirements, and for using the residual heat in the fluid effectively, after the said heat exchange with the water desired for hot water purposes in the boiler has taken place, the use for heating purposes can be realized in a simple and economic manner.

In areas with a substantial amount of sun hours, in particular close to the equator, also other application fields may be considered: the supply of heat for cooking, baking, frying and in households etc., the large scale energy recovery for power plants and for thermal water pumps. Another useful application is in air conditioning installations.

In those cases requiring temperatures up to 300° C — which have been found attainable with apparatus according to the invention under suitable conditions — a suitable oil will be chosen as the fluid. It is likewise possible to employ air or gases as fluid to be directly heated by the sun in the apparatus invented.

The invented system of reflection surfaces that are retractable upon a pivoting movement also offers favourable possibilities in the concentration of sun rays for direct conversion into electric power, so-called thermo-electric conversion or photovoltaic conversion.

When it concerns the application of the invented apparatus for power supply, via the generation of steam, like the above described application for power plants, and the like, steam circuit conduits may be disposed coaxially extending in the interior of the fluid warming-up tubes.

As regards the practical design of apparatus according to the invention, mass manufacture is possible of sheets 1.2×1.6 m in size and a depth of about 0.25 m, allowing also an effective application in large buildings.

The centre-to-centre distance of the fluid warming-up tubes may be e.g. about 10 cm and the internal diameter about 25 mm. With a roof surface area of e.g. 60–70 m$^2$, it appears that under the conditions prevailing in most West European countries, about 150 l. per hour on an average can be warmed up to a temperature level sufficient for hot water supply and also for heating purposes.

For industrial application, e.g. for the generation of steam for power plants, naturally larger sizes, in particular also fluid warming-up tubes having diameters in excess of 25 mm, will be considered.

The invention will now be explained, by way of example, with reference to the accompanying drawings, wherein:

FIG. 1 is a cross-section perpendicular to the longitudinal direction of a plurality of parallel fluid warming-up tubes, partly in elevation, showing in different parts of the Figure in different positions, bodies pair-wise forming a dihedral angle, of a fluid warming-up apparatus according to the invention;

FIG. 2 is an elevation of a part of the apparatus shown in FIG. 1 in the direction of light incidence at the highest sun position, assuming that the apparatus with its fluid warming-up tubes is arranged in co-planar relationship, extending substantially in East-West direction;

FIG. 3 is a cross-section on the line III—III in FIG. 1;

FIG. 4 shows diagrammatically a modified embodiment for the drive of a plurality of successive bodies pair-wise forming a dihedral angle;

FIG. 5 is a corresponding cross-section on the line V—V of FIG. 4;

FIG. 6 shows diagrammatically, on a reduced scale, how the reflection surfaces for a number of successive fluid warming-up tubes can be formed by one and the same continuous reflecting band.

As shown in FIGS. 1–3, there is generally indicated by reference numeral 1 a fluid warming-up apparatus according to the invention. The apparatus comprises seven fluid warming-up tubes. In FIG. 1 reference numerals 2a–2g indicate the centre-lines of said tubes, which lie in one plane. Said tubes extend in parallel, North-South directed, vertical planes having a centre-to-centre distance a (FIG. 1). The fluid warming-up tubes contain the fluid to be heated by the sun rays, each being surrounded by a tube coaxial therewith, transparent at least at the light incidence side. The latter tubes have reference numerals 3a–3g in FIG. 1. As shown in FIG. 2, the tubes containing fluid, e.g. a suitable oil, preferably with a black pigment, are connected through periodically operative valves 4a, 4b, to a manifold 5 extending to a heat exchange unit, not shown in FIGS. 1–3, which dispenses the heat accumulated in the fluid contained in the fluid warming-up tubes to another medium, in particular water.

By numeral 6 is indicated in FIG. 1 a casing accommodating the fluid warming-up tubes with, at the front side facing the South, a glass cover plate 7 and portions of the glass cover plates 8,9 forming the sidewalls of the casing.

By numerals 10–17 are indicated dihedral angles forming bodies, which are arranged pivotally and movably adjacent the outermost tubes 3a, 3g, respectively, and between two successive tubes, as will be described in more detail in the following.

The bodies 10–17 each have two surfaces enclosing an angle $\alpha$ of 36° which for the bodies 11–16 are both reflecting and of which for the bodies 10 and 17, the only reflecting surface is the one bounding the adjacent tube 3a, 3g, respectively.

The bodies 10–17 are made of light synthetic material, e.g. a polystyrene foam, having a very slight thermal conductivity. The reflection surfaces consist of polished aluminum.

In the end faces of the bodies, transverse to the surfaces enclosing angle $\alpha$, only one of which is shown for each body in elevation in FIG. 1, and which boundary faces in said Figure are designated by numerals 10a–17a, there are recessed slots extending according to the bisector plane of the angle $\alpha$. Said slots are indicated in the end faces shown in FIG. 1 by numerals 10b–17b.

In the said slots 10b–17b and likewise in the slots recessed in the opposite end faces, extend on either side fixed axle pins indicated by 20–27 at the ends shown in FIG. 1. In FIG. 3 one axle pin 25 is shown for the dihedral forming angle 15 by broken lines, extending in slot 15b.

Said slots extend about three quarters of the length of the perpendicular in the triangular end faces of the bodies 10–17.

Likewise substantially according to the bisector plane of angle α, there projects from each body 10–17 a clip-shaped extension, which clip-shaped extensions are indicated in FIG. 1 by numerals 30–37. At their ends facing away from the bodies 10–17, said extensions 30–37 are rotatably connected to a coupling rod 38 interconnecting all extensions. Since the extensions 30–37 are all identical, the rod 38 extends parallel to the plane defined by the centreline 2a–2g.

The coupling rod 38, at longitudinally spaced apart locations 39–42, is connected to a flexible pulling member 44 guided in a guide 43 having the shape as shown in FIG. 1, in the present case a chain. Of the four locations 39–42, locations 39 and 41 are shown in FIG. 1 in the positions occupied by them at the moment when the sun is at its highest position, when the bodies forming a dihedral angle as shown in FIG. 1 for bodies 10,11,12 and 15 occupy their mid-position going with 12 o'clock noon.

It should be noted, for that matter, that the angle enclosed by the reflection surfaces associated with each warming-up tube i.e. the two adjoining reflection surfaces of each pair of successive bodies 10–17, remains constant in all positions of bodies 10–17, as will be apparent from the foregoing and the accompanying drawings. The said angles are designated in the drawing by α' and are naturally equal to α, i.e. in the present case 36°.

Locations 40 and 41, in the position indicated by numerals 40' and 41' are shown for the pivoting position occupied in the morning, at the beginning of the day cycle, by the bodies 13 and 14 likewise shown accordingly. In respect of location 42 — and also the associated portion of the coupling rod 38 — the same applies for the position occupied at the end of the day cycle. Both location 42 and the respective coupling rod portion 38 are provided with numerals 42", 38", respectively, in view of this extreme position.

The pulling member 44 running in the guide 43, is moved from left to right during the daylight period effective for the invented apparatus, together with the part extending between the reversing places 45 and 46, in such a way that the bodies 10–17, in the morning at the start of the operation of the apparatus, occupy the position as shown for the bodies 13 and 14, with the coupling rod 38 in the position shown for the portion 38' thereof; in the afternoon the position as depicted in FIG. 1 for the bodies 10,11,12 and 15 with the coupling rod in the position as indicated for the pieces having the numeral 38; and in the evening before sunset the position as indicated for the bodies 16 and 17, with the coupling rod in the position as indicated for the portion having numeral 38" in FIG. 1.

At night the chain is so reversed that the lower part in FIG. 1 again moves from right to left so that the next day, after sunrise, the cycle of motion as just described, can again be completed.

The dihedral-angle-forming bodies 10–17—as shown in the drawings — thereby will continue to occupy a position substantially tangent to the cylindrical circumferential surfaces of the tubes 3a—3g; naturally, the two outermost bodies 10 and 17 continue to be tangent only to one circular cylindrical circumferential surface and the other bodies each time with their two reflection surfaces being tangent to two successive circular cylindrical circumferential surfaces.

The bodies 10–17 are so moved that the bisector plane between each pair of successive reflection surfaces is maintained directed to the sun, thus attaining the maximally useful yield of the sun rays incident through the glass sheets 7,8 and 9 on the tubes with axes 2a–2g. The centre-to-centre distance a of the successive tubes is minimal and, as a result of the backward movability of the reflection surfaces, there are no shaded "dead angles" conducive to loss in yield.

The drive of the pulling member, i.e. the chain 44, which is shown by dash-dot lines in FIG. 1, in the guide 43, is effected by means of a chain wheel 48. By numeral 47 is shown in FIG. 1 a tension spring for the chain 44.

FIG. 4 shows at 111 and 112 two bodies each forming a dihedral angle between fluid warming-up tubes 101 and 102 and between 102 and 103, respectively.

The double lines of the boundary faces of said bodies indicate — as in FIG. 1 — the reflecting surfaces of the bodies.

The end faces 111a and 112a of the bodies 111 and 112 comprises slots 111b, 112b. By 131 and 132 are indicated the clip extensions associated with the bodies 111 and 112. Said extensions are pivotally connected at their top ends, as seen in FIG. 4, at 141 and 142, respectively, to coupling rod 138. At 142 the extension 132 is likewise pivotally connected to a flat rod 143 with, at the top of FIG. 4, a toothed, arcuate longitudinal edge 144. A gear wheel 145 mounted in a fixed point is in engagement with the teeth of said edge 144. The shaft 146 of gear wheel 145 is rotatably mounted in a fixed sheet 147 which, at the respective end, forms the closure of the space accommodating the fluid warming-up tubes 101, 102 and 103.

The gear wheel 145 on the shaft 146 is driven by an electric motor 148 at the opposite side of sheet 147 (FIG. 5).

By 149 and 150 are indicated the attachment locations for the shafts of two roller bearings, the roller bearing associated with attachment location 150 being indicated by 151 in FIG. 5. By 152 is indicated a guide for roller bearing 151 recessed in sheet 147, which roller bearing reciprocates in the left half (in FIG. 4) of the guide 152, while the right half is destined for a corresponding roller bearing, not shown, associated with the attachment location 150.

After this explanation of FIGS. 4 and 5, it will be clear that the movement of the bodies 10–17 described in the above can be effected similarly for the bodies 111 and 112 and subsequent bodies, not shown, when these are coupled correspondingly to the rod 138 and are mounted correspondingly through slots on axle pins, as described for the bodies 111 and 112, when gear wheel 145 is driven by motor 148.

In FIG. 6 there is indicated by numeral 201, at the left in the Figure, and 201', at the right in the Figure, a continuous, flexible band, reflective on the bottom side, which runs over two series of reversing rollers. The fluid warming-up tubes are indicated here by 211, 212, 213, 214 and 215.

The outer reversing rollers (the lower ones in FIG. 6) have numerals 220, left, and 220', right, in FIG. 6, and the inner reversing rollers have numerals 230 and 230', respectively. By 240 is indicated a fixedly disposed guide roller and by 241 a take-up roller for the band 201, 201', respectively. Rollers 220, 220' and 230, 230' are movably mounted. Shown on the left in FIG. 6 is the position of said rollers, designated by numerals without an apostrophe, for the situation at noon, and on the right, designated by accented numerals, the one extreme position when the sun rays are slanting from the left at the bottom of FIG. 6. For the morning sun rays slanting from the right at the bottom of the Figure, the situation is the mirror image of that depicted at the right in FIG. 6. The bearings of the shafts for the rollers 230, 230' have guides extending according to circular arcs 251, 252, 253, 254 and 255 that are concentric to the respective fluid warming-up tubes. The bearings of the shafts for the rollers 220, 220' are disposed at the ends of rods, one of which is shown diagrammatically in FIG. 6 for the leftmost roller 220. Said rod 261 is provided in a longitudinal portion with an elongated slot 262 comparable with e.g. the slots 10b, 11b etc. in FIG. 1 and 111b, 112b in FIG. 4. An axle pin 272 extends into said slot. By 263 is indicated a pivot for attachment to a coupling rod 238. The drive of said rod may be effected similarly to that described in the above for rod 38 in FIG. 1.

The movement of the inner reversing rollers 230, 230' should also be controlled so that the various parts of the band 201, 201' continue to be substantially tangent to the cylinder surfaces concentrical with the fluid warming-up tubes 211–215.

Take-up roller 241, towards which band 201, 201' runs via guide roller 240 is spring-urged, not shown, to ensure that band 201, 201' remains tensioned.

I claim:

1. Apparatus for recovering solar energy, the combination comprising a casing, a plurality of warming-up cylindrical tubes extending in parallel and side-by-side relationship in said casing, each tube having an associated pair of substantially flat reflection surfaces angularly diverging therefrom, means supporting said reflection surfaces tangent to their associated cylindrical tubes and including pivotal means whereby said reflecting surfaces reflect incident sun rays towards said tube while being pivoted to maintain their bisector face towards the sun, and coupling means for moving said reflecting surfaces relative to said pivotal means with a direction component transverse to a plane defined by said tubes.

2. Apparatus according to claim 1 wherein the two adjoining reflection surfaces associated with each pair of successive tubes are combined to form dihedral angle end walls, one on each end of said two adjoining reflection surfaces.

3. Apparatus according to claim 2, wherein said pivotal means comprises a pivot pin for each end wall, a pair of said pins defining a fixed axle for a pair of end walls, wherein a slot is disposed in each end wall, and said pivot pin end wall extends through its associated slot.

4. Apparatus according to claim 3, wherein said coupling means includes a coupling rod extending in a plane substantially parallel to the plane defined by the tubes, said coupling rod interconnecting one of said pair of end walls to other end walls whereby unitary movement is imparted thereto, and guide means mounted in said casing and driving said coupling rod for simultaneous movement of said end walls and said reflection surfaces.

5. Apparatus according to claim 1, wherein a continuous reflecting band defines said reflection surfaces, and wherein a plurality of return rollers are mounted in said casing for movement therein, said continuous reflecting band being run over said return rollers, and means exerting a tension force on said continuous reflecting band at the ends thereof to keep said band in taut condition.

* * * * *